US011184746B2

United States Patent
Chiaverini et al.

(10) Patent No.: US 11,184,746 B2
(45) Date of Patent: Nov. 23, 2021

(54) SYSTEMS AND METHODS FOR GRANULAR USAGE REPORTING IN MULTI-RAN TELECOMMUNICATIONS SYSTEMS

(71) Applicant: Verizon Patent and Licensing Inc., Arlington, VA (US)

(72) Inventors: Marc Chiaverini, Randolph, NJ (US); Lixia Yan, Basking Ridge, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 16/444,847

(22) Filed: Jun. 18, 2019

(65) Prior Publication Data
US 2020/0404466 A1 Dec. 24, 2020

(51) Int. Cl.
*H04W 4/24* (2018.01)
*H04M 15/00* (2006.01)

(52) U.S. Cl.
CPC ............ *H04W 4/24* (2013.01); *H04M 15/64* (2013.01); *H04M 15/773* (2013.01)

(58) Field of Classification Search
CPC ....... H04W 4/24; H04W 80/08; H04W 24/08; H04W 24/10; H04L 12/14; H04L 12/1403; H04M 15/00; H04M 15/41; H04M 15/58; H04M 15/60; H04M 15/64; H04M 15/773; H04M 15/82
See application file for complete search history.

(56) References Cited

U.S. PATENT DOCUMENTS

| | | | |
|---|---|---|---|
| 2006/0105795 A1* | 5/2006 | Cermak | H04W 12/02 455/518 |
| 2015/0057044 A1* | 2/2015 | Altman | H04M 15/8055 455/558 |
| 2018/0270073 A1* | 9/2018 | Senarath | H04M 15/46 |
| 2019/0174342 A1* | 6/2019 | Yokoyama | H04L 43/0876 |
| 2019/0312980 A1* | 10/2019 | Kim | H04L 12/141 |
| 2020/0052916 A1* | 2/2020 | Kaki | H04M 15/00 |
| 2020/0396631 A1* | 12/2020 | Han | H04W 76/15 |

OTHER PUBLICATIONS

"5G Deployment Option-3/3a/3x", available at http://www.blacktechnoguys.com/2019/01/5g-deployment-option-33a3x.html, visited May 22, 2019).
3GPP TS 29.274 V15.8.0, Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15), Jun. 2019.

* cited by examiner

*Primary Examiner* — Margaret G Mastrodonato

(57) ABSTRACT

A system described herein may track usage, on a per-User Equipment ("UE") basis, in systems that provide for simultaneous connectivity to a given UE via multiple base stations. A cycle cutoff time may be determined, a master base station (to which the UE is connected) may be notified of the cycle cutoff time, and the master base station may notify one or more secondary base stations (to which the UE is connected) of the cycle cutoff time. The master base station and/or the one or more secondary base stations may track usage, of the UE, until the cycle cutoff time, and may report the usage such that the usage via each of the base stations may be able to be determined.

20 Claims, 9 Drawing Sheets

SYSTEMS AND METHODS FOR GRANULAR USAGE REPORTING IN MULTI-RAN TELECOMMUNICATIONS SYSTEMS

BACKGROUND

Wireless telecommunication networks may include multiple radio access networks ("RANs"), and/or may utilize multiple radio access technologies ("RATs"). Some wireless telecommunications networks use dynamic billing procedures, in which the cutoff time for a billing cycle may be set on a per-subscriber basis, and may vary from cycle to cycle.

DETAILED DESCRIPTION OF THE PREFERRED EMBODIMENTS

The following detailed description refers to the accompanying drawings. The same reference numbers in different drawings may identify the same or similar elements.

Wireless telecommunications networks may utilize a multi-RAN architecture in order to provide connectivity via multiple RATs in a particular geographical area. For example, a particular wireless telecommunications network provider may offer a Fifth Generation ("5G") RAT in order to provide high-speed, low-latency connectivity, and may also offer a Long-Term Evolution ("LTE") RAT in order to provide additional coverage. In these systems, one possible configuration includes one base station (e.g., a base station of a first RAT, such as an LTE base station (e.g., an evolved Node B ("eNB")) acting as a "master" base station, with another base station (e.g., a base station of a second RAT, such as a 5G base station (e.g., a Next Generation Node B ("gNB")) acting as a "secondary" base station. In some embodiments, the master base station may aggregate usage data from the secondary base station (e.g., an amount of data sent to and/or received from a given UE via the secondary base station), as well as its own usage data (e.g., an amount of data sent to and/or received from a given UE via the master base station) to generate an aggregated usage report, and provide the aggregated usage report to the wireless telecommunications network. Thus, the aggregated usage report may separately indicate (1) the usage, associated with the UE, via the master base station, and (2) the usage, associated with the UE, via the secondary base station. The aggregated usage report may be used to track UEs' usage of each of the different RANs, and may be tracked on a cyclical basis (e.g., every 28 days, every 30 days, every calendar month, etc.).

Figure 1A:
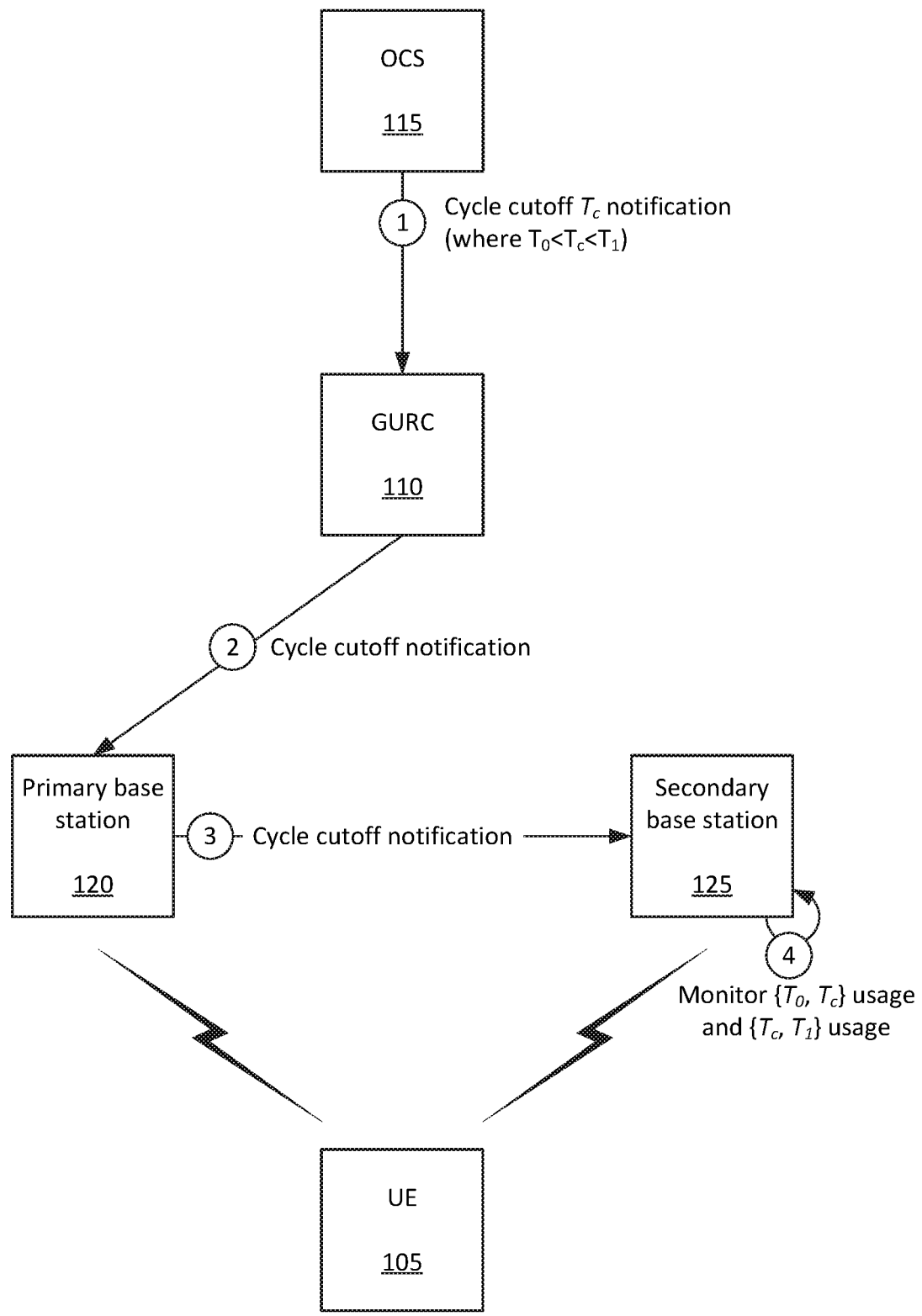
FIGS. 1A and 1B illustrate an example overview of one or more embodiments described herein, in which usage on multiple RATs, on a per-subscriber basis, may be determined.

In some scenarios, the cutoff time for a cycle may vary. For instance, one cycle for a given UE may end at 12:01 AM on the last day of one month, while the next cycle for the same UE may end at 12:06 AM on the last day of the subsequent month. Embodiments described herein may allow for the usage of multiple RANs to be determined in a granular and dynamic manner. For example, as shown in FIG. 1A, UE 105 may communicate with a wireless telecommunications network via primary base station 120 and secondary base station 125. In this example, primary base station 120 and secondary base station 125 may be configured to monitor usage (e.g., amount of data transferred to and/or from UE 105) on a periodic basis, where one example period begins at time $T_0$ and ends at time $T_1$.

A device or system, such as Online Charging System ("OCS") 115 may output (at 1) a cycle cutoff notification, indicating a cycle cutoff time $T_c$, which is in between times $T_0$ and $T_1$. The notification may be received by GURC 110 in accordance with some embodiments, which may output (at 2) a notification to primary base station 120, indicating the cycle cutoff time ($T_c$). Primary base station 120 may notify (at 3) secondary base station 125 of the cycle cutoff time. Secondary base station 125 may monitor (at 4) the usage by UE 105 between times $T_0$ and $T_c$ (as denoted by the notation "$\{T_0, T_c\}$" in the figure). In some embodiments, secondary base station 125 may also continue monitoring the usage by UE between times $T_c$ and $T_1$. Additionally, primary base station 120 may also monitor the usage of UE 105 between times $T_0$ and $T_c$ and/or between times $T_c$ and $T_1$.

Figure 1B:
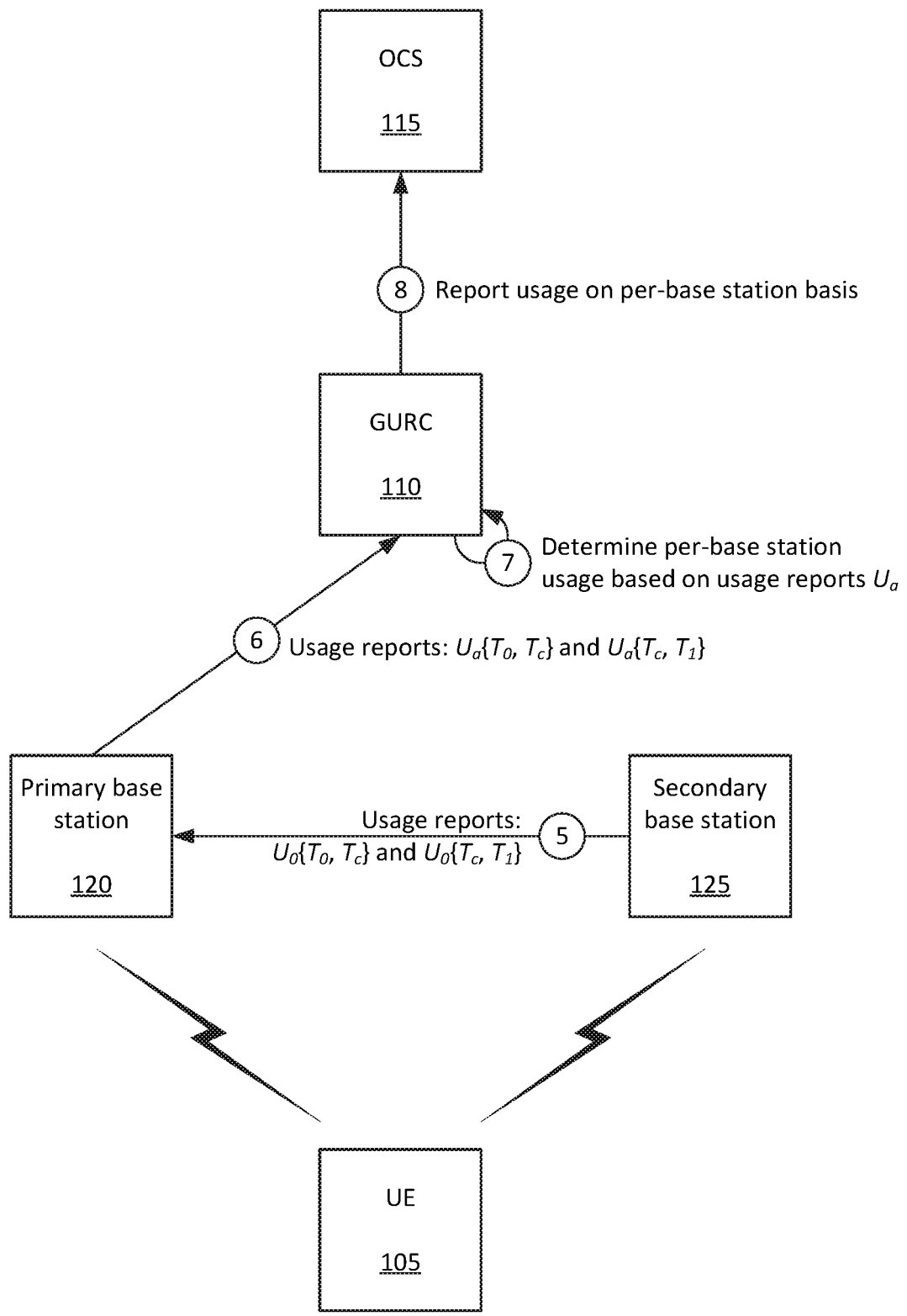

As shown in FIG. 1B, secondary base station 125 may output (at 5) usage reports $U_0$, where $U_0\{T_0, T_c\}$ indicates usage of secondary base station 125, by UE 105, between times $T_0$ and $T_c$. Primary base station 120 may generate an aggregated usage report $U_a\{T_0, T_c\}$, which is based on $U_0\{T_0, T_c\}$ and is further based on usage of primary base station 120, by UE 105, between times $T_0$ and $T_c$. That is, aggregated usage report $U_a\{T_0, T_c\}$ may indicate usage of secondary base station 125, by UE 105, between times $T_0$ and $T_c$, and may further indicate usage of primary base station 120, by UE 105, between times $T_0$ and $T_c$. Additionally, aggregated usage report $U_a\{T_c, T_1\}$ may indicate usage of secondary base station 125, by UE 105, between times $T_c$ and $T_1$, and may further indicate usage of primary base station 120, by UE 105, between times $T_c$ and $T_1$.

Primary base station 120 may output (at 6) the aggregated usage report $U_a\{T_0, T_c\}$ to GURC 110. Based on the aggregated usage report $U_a\{T_0, T_c\}$, GURC 110 may precisely determine (at 7) the per-base station usage by UE 105 before and after the cycle cutoff time K. GURC 110 may, in some embodiments, output (at 8) information indicating the per-base station usage by UE 105 (e.g., to OCS 115 and/or some other device or system).

Figure 2:
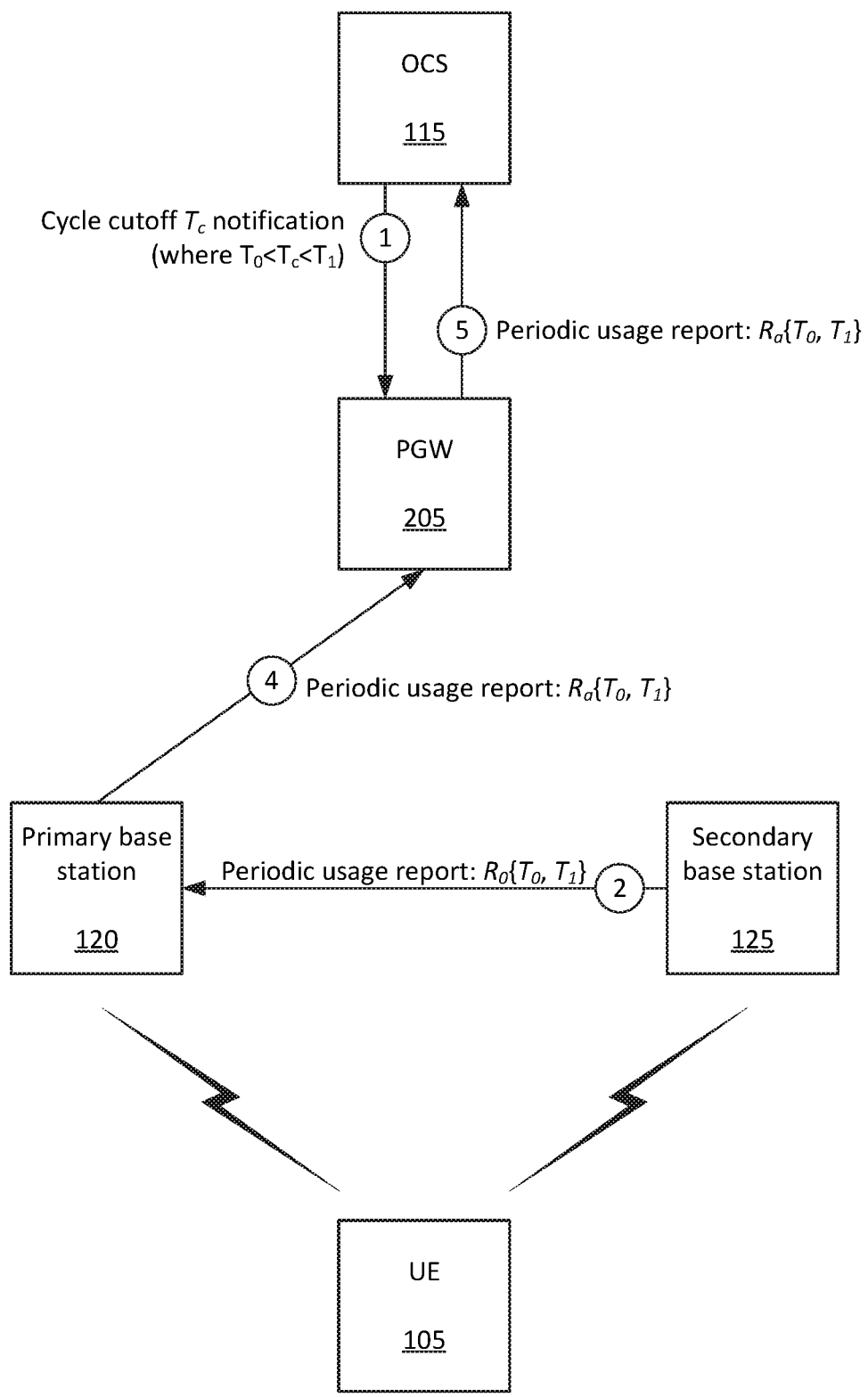
FIG. 2 illustrates an example in which usage reports on multiple RATs, for a given subscriber, may not properly reflect dynamically set cycle cutoff times.

FIG. 2 illustrates a technique in which a usage report R does not necessarily account for dynamically set cycle cutoff times. For instance, OCS 115 may output (at 1) a cycle cutoff notification, indicating that time $T_c$ is a cycle cutoff time for UE 105. However, primary base station 120 and secondary base station 125 may have been previously configured to generate usage reports on a periodic basis, including a usage report from times $T_0$ to $T_1$. As shown, secondary base station 125 may provide (at 2) usage report $R_a\{T_0, T_1\}$ primary base station 120, and primary base station 120 may also monitor the usage of UE 105 between times $T_0$ and $T_1$. Primary base station 120 may generate an aggregated usage report $R_a\{T_0, T_1\}$ and provide the aggregated usage report $R_a\{T_0, T_1\}$ to PGW 205. PGW 205 may forward (at 5) the aggregated usage report $R_a\{T_0, T_1\}$ to OCS 115. In some embodiments, the aggregated usage report $R_a\{T_0, T_1\}$ may be used to generate a summary or statement of usage over a given time period (e.g., cycle). However, as noted above, the aggregated usage report may span multiple cycles (e.g., before and after time $T_c$), and thus may not be accurate or precise.

Figure 3:
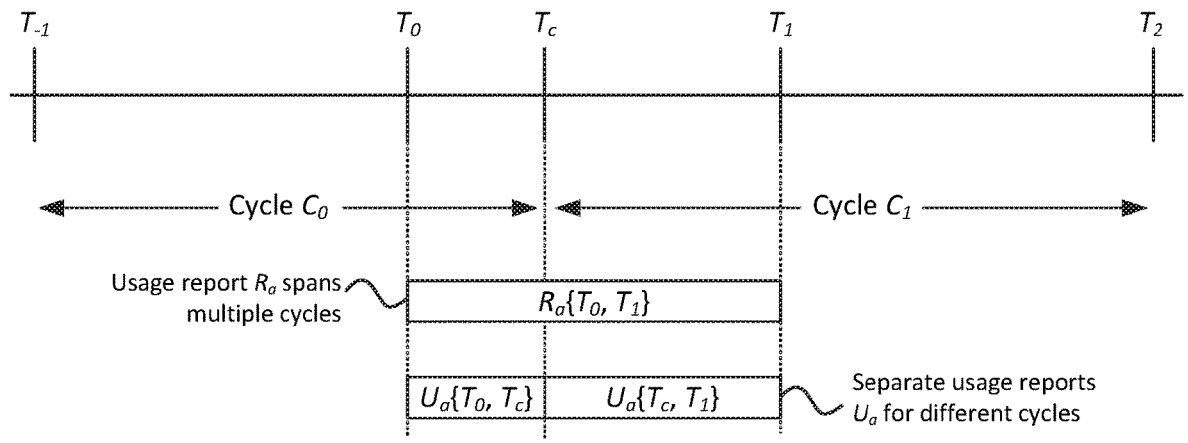
FIG. 3 conceptually demonstrates usage reports that may be generated in accordance with the examples shown in FIGS. 1A, 1B, and 2.

Referring, for example, to FIG. 3, a first cycle $C_0$ may begin at time $T_{-1}$ and end at time $T_c$, and a second cycle $C_0$ may begin at time $T_c$ and end at time $T_2$. As shown, aggregated usage report $R_a$ (as discussed with respect to FIG. 2) spans both cycles. Thus, the precise usage for either cycle is not reflected in the aggregated usage report $R_a$. As further shown, aggregated usage report $U_a\{T_0, T_c\}$ (as discussed with respect to FIGS. 1A and 1B) ends at $T_c$. Thus, combined with a usage report that covers times $T_{-1}$ through $T_0$, the precise usage during cycle $C_0$ can be determined, in accordance with embodiments described herein.

Figure 4:
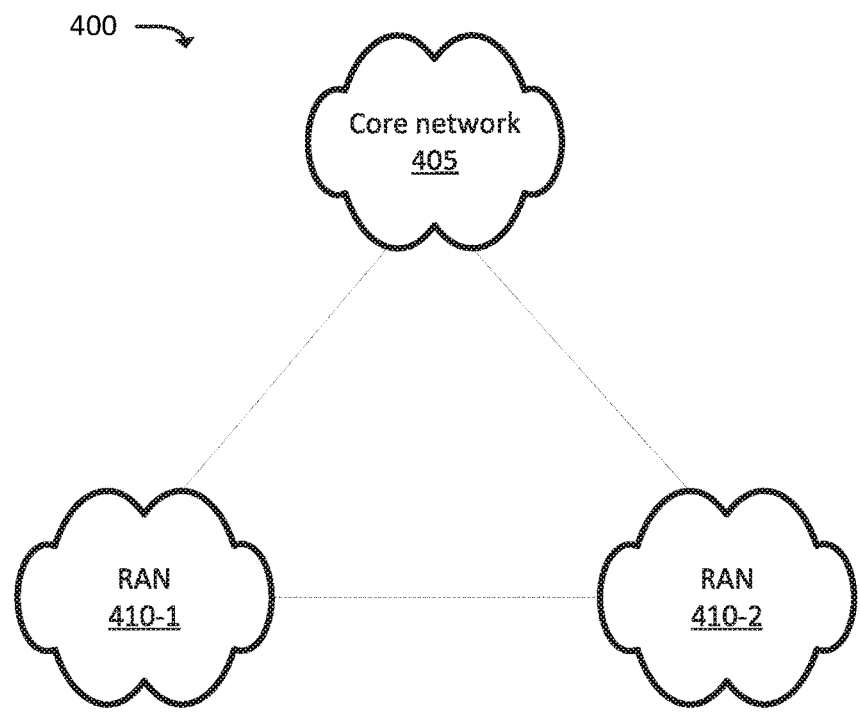
FIG. 4 illustrates an example environment, in which one or more embodiments described herein may be implemented.

FIG. 4 illustrates an example environment 400, in which one or more embodiments may be implemented. As shown, environment 400 may include core network 405, RAN 410-1, and RAN 410-2. Core network 405 may provide control signaling and data connectivity services to UEs 105 that are communicatively coupled to RAN 410-1 and/or to RAN 410-2. One example of core network 405 is an Evolved Packet Core ("EPC") network that is based on a Third Generation Partnership ("3GPP") standard. As described in more detail below, RANs 410 may each include one or more base stations that communicate with UEs 105 via an air interface, and may, in some embodiments, implement different RATs. RANs 410 may be communicatively coupled, such that control messaging and/or user plane data is routed through one of the RANs 410. For example, assume that RANs 410-1 and 410-2 are arranged in a hierarchical manner, such that RAN 410-1 is a "master" RAN and that RAN 410-2 is a "secondary" RAN. One example of such an arrangement is a 3GPP Option 3X architecture. In some embodiments, RANs 410 implement different RATs. For instance, in some embodiments, RAN 410-1 may implement a 4G RAT, while RAN 410-2 may implement a 5G RAT. In some embodiments, RANs 410 may implement the same RAT.

Figure 5:
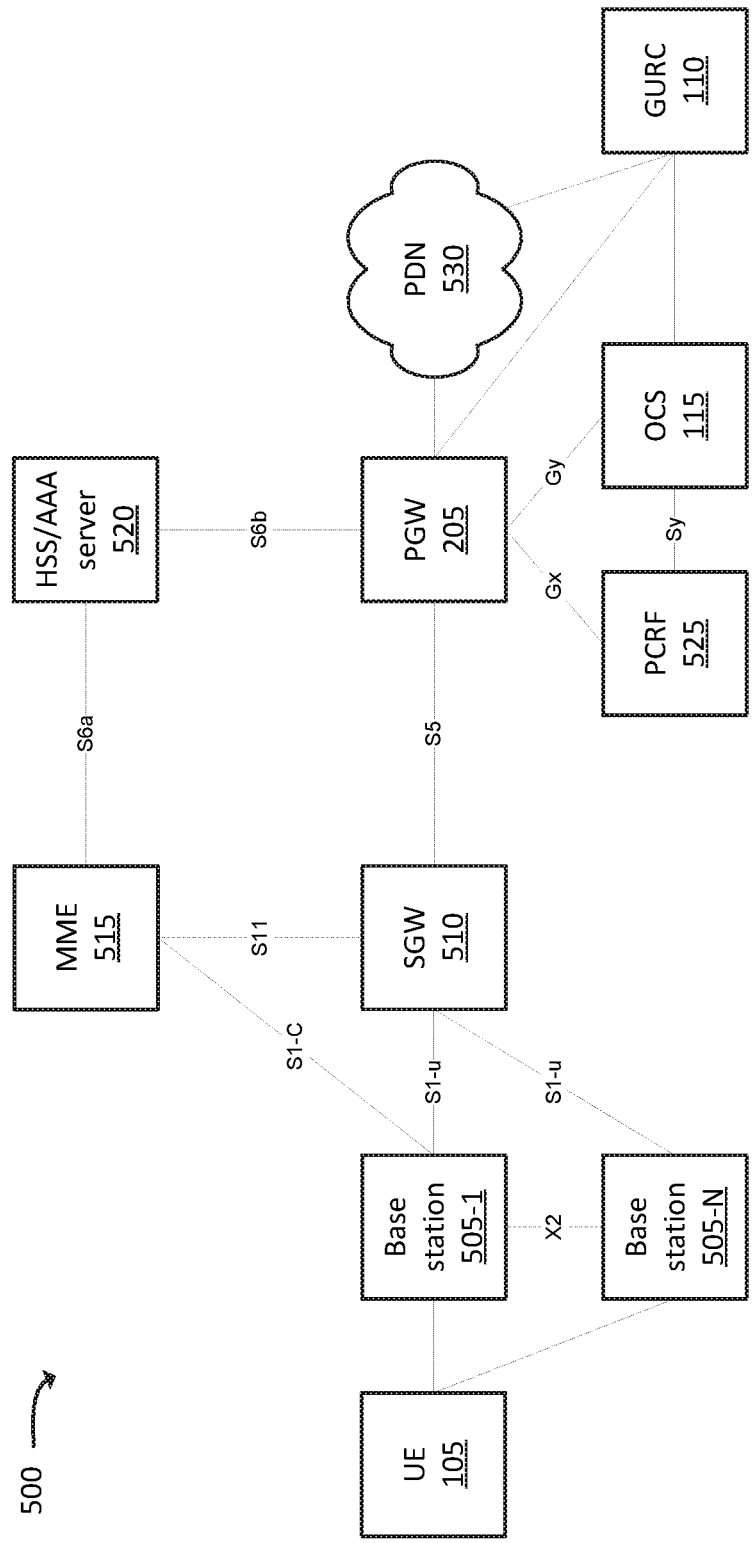
FIG. 5 illustrates an example environment, in which one or more embodiments described herein may be implemented.

FIG. 5 illustrates an example environment 500, in which one or more embodiments may be implemented. As shown, environment 500 may include UE 105, one or more base stations 505 (shown in the figure as base stations 505-1 through 505-N), Serving Gateway ("SGW") 510, Mobility and Management Entity ("MME") 515, Home Subscriber Server ("HSS")/Authentication, Authorization, Accounting ("AAA") server (hereinafter referred to as "HSS/AAA server") 520, Policy Charging and Rules Function ("PCRF") 525, PGW 205, OCS 115, GURC 110, and Packet Data Network ("PDN") 530.

The quantity of devices and/or networks, illustrated in FIG. 5, is provided for explanatory purposes only. In practice, environment 500 may include additional devices and/or networks; fewer devices and/or networks; different devices and/or networks; or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environments 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 105 may include a computation and communication device, such as a wireless mobile communication device that is capable of communicating with base stations 505, PDN 530, and/or one or more other devices and/or systems. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 105 may send traffic to and/or receive traffic from PDN 530 via one or more base stations 505, SGW 510, PGW 205, and/or GURC 110.

Base station 505 may include one or more network devices that receive, process, and/or transmit traffic, such as calls, audio, video, text, and/or other data, destined for and/or received from UE 105. Base station 505 may receive traffic, destined for UE 105, from SGW 510, PGW 205, GURC 110, and/or PDN 530, and may output the traffic to UE 105. Base station 510 may also receive traffic from UE 105, and may output the traffic to its intended destination via SGW 510, PGW 205, GURC 110, and/or PDN 530. As mentioned above, base stations 505 may be part of a hierarchical architecture, such as a 3GPP Option 3X architecture, in which one base station (e.g., base station 505-1) is a "master" base station that provides data and control signaling to one or more "secondary" base stations (e.g., base station 505-N), and/or receives data and/or control signaling from one or more secondary base stations and provides the data and/or control signaling to one or more other devices of the network (e.g., to SGW 510 and/or MME 515).

SGW 510 may include one or more network devices that gather, process, store, and/or provide information in a manner described herein. SGW 510 may, for example, aggregate traffic received from one or more base stations 360, and may send the aggregated traffic to PDN 530 via PGW 205. SGW 510 may, in some embodiments, receive traffic intended for UE 105 or MME 515, and may forward the traffic to UE 105 or MME 515, respectively.

MME 515 may include one or more computation and communication devices that perform operations to register UE 105, to establish bearer channels with UE 105, to facilitate handovers, and/or to perform other operations. MME 515 may perform policing operations on traffic destined for and/or received from UE 105. MME 515 may, in some embodiments, receive messages via control plane signaling, which are destined to and/or sent from UE 105. In some embodiments, MME 515 may forward and/or generate control plane signaling, based on communications from GURC 110 (e.g., in accordance with embodiments described herein), to one or more base stations 505.

PGW 205 may include one or more network devices that gather, process, store, and/or provide information in a manner described herein. PGW 205 may aggregate traffic received from one or more SGWs 510, etc. and may send the aggregated traffic to PDN 530. PGW 205 may also, or alternatively, receive traffic from PDN 530 and may send the traffic toward UE 105 via base station 505 and/or SGW 510.

PGW 205 may, in some embodiments, generate or aggregate usage information from one or more base stations 505. For instance, PGW 205 may receive periodic or intermittent usage reports from one or more base stations 505, and generate usage reports on a per-cycle basis (e.g., where a cycle may span a duration of time for which multiple usage reports are received).

GURC 110 may include one or more network devices that gather, process, store, and/or provide information in a manner described herein. In some embodiments, some or all of the functionality described herein with respect to GURC 110 may be performed by PGW 205. In some embodiments, GURC 110 may be communicatively coupled to PGW 205, and may receive some or all of the traffic that is sent to, and/or is sent via, PGW 205. As described herein, GURC 110 may notify one or more base stations 505 of a cycle cutoff time. GURC 110 may receive a notification from OCS 115 and/or some other device or system, and/or may determine the cycle cutoff time.

OCS 115 may include one or more network devices that gather, process, store, and/or provide information in a manner described herein. In some embodiments, OCS 115 may determine cycle cutoff times and notify PGW 205, GURC 110, and/or some other device or system of the cycle cutoff times. The cycle cutoff times may be determined on a per-UE basis and, for a given UE 105, may change on a cycle-to-cycle basis.

PCRF 525 may include one or more devices that aggregate information to and from the EPC network and/or other sources. PCRF 525 may receive information regarding policies and/or subscriptions from one or more sources, such as subscriber databases and/or from one or more users (such as, for example, an administrator associated with PCRF 525).

HSS/AAA server 520 may include one or more devices that manage, update, and/or store, in a memory associated with HSS/AAA server 520, profile information associated with a subscriber. HSS/AAA server 520 may perform authentication, authorization, and/or accounting operations associated with the subscriber and/or a communication session with UE 105.

PDN 530 may include one or more wired and/or wireless networks. For example, PDN 530 may include an Internet Protocol ("IP")-based PDN, a wide area network ("WAN") such as the Internet, a private enterprise network, and/or one or more other networks. UE 105 may communicate, through PDN 530, with data servers, other UEs 105, and/or to other servers or applications that are coupled to PDN 530. PDN 530 may be connected to one or more other networks, such as a public switched telephone network ("PSTN"), a public land mobile network ("PLMN"), and/or another network. PDN 530 may be connected to one or more devices, such as content providers, applications, web servers, and/or other devices, with which UE 105 may communicate.

Figure 6:
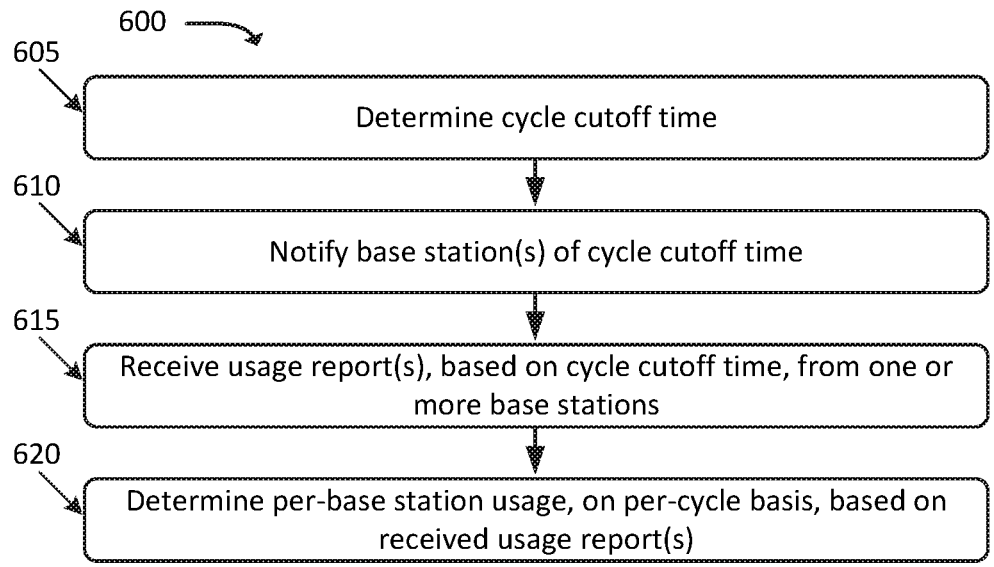
FIG. 6 illustrates an example process for determining usage on multiple RATs for a given UE, in a manner that accounts for dynamically set cycle cutoff times.

FIG. 6 illustrates a process 600 for determining per-base station usage, on a per-cycle basis, by one or more UEs. In some embodiments, some or all of process 600 may be performed by GURC 110, and/or by one or more other devices or systems.

As shown, process 600 may include determining (at 605) a cycle cutoff time. For example, GURC 110 may receive a message from OCS 115 and/or some other device or system, indicating a particular cycle cutoff time. In some embodiments, GURC 110 may determine a cycle cutoff time based on one or more other factors. For instance, GURC 110 may receive information indicating one or more times during which a given UE 105 is not authorized to access data (e.g., based on a restriction placed by a subscriber associated with UE 105 and/or by an operator of a wireless telecommunications network). GURC 110 may determine that a cycle cutoff time corresponds to a time at which UE 105 becomes unauthorized to access the wireless telecommunications network.

Process 600 may further include notifying (at 610) a master base station of the cycle cutoff time. For example, GURC 110 may output one or more messages to a master base station (e.g., base station 505-1) indicating the cycle cutoff time. As discussed below, the message may include a General Packet Radio Service ("GPRS") Tunneling Protocol ("GTP") message sent to MME 515. Based on this notification, and as discussed above, master base station 505-1 may notify one or more secondary base stations (e.g., base station 505-2) of the cycle cutoff time, and may receive usage reports from base station 505-2. As additionally discussed above, base station 505-1 may generate an aggregated usage report based on its own monitored usage by UE 105, as well as the usage reports received from base station 505-2.

Process 600 may additionally include receiving (at 615) one or more usage reports, that are based on the cycle cutoff time, from the master base station. For example, GURC 110 may receive the aggregated usage report from base station 505-1, which indicates usage of base station 505-1 and base station 505-2 up to the cycle cutoff time. In some embodiments, instead of receiving an aggregated usage report from base station 505-1, GURC 110 may receive an indication of a total usage associated with UE 105 (e.g., a total amount of data sent and/or received by UE 105, which may be determined by GURC 110, PGW 205, and/or some other device or system), as well as an indication of usage of base station 505-2. For instance, base station 505-1 may forward a usage report, indicating usage of base station 505-2 by UE 105, without generating or forwarding an "aggregated" usage report (and/or without otherwise reporting usage of base station 505-1 by UE 105). GURC 110 may, in some such embodiments, determine the usage of base station 505-1 by UE 105 by subtracting the usage of base station 505-2 by UE 105 from the total usage associated with UE 105.

Process 600 may also include determining (at 620) per-base station usage, on a per-cycle basis, based on the received usage reports. For example, a cycle may include a span of time for which multiple usage reports were received (e.g., where each usage report indicates usage during a portion of the cycle), including a usage report that starts and/or ends at a time that was determined (at 605) as a cycle cutoff time. Determining the per-cycle usage based on the cycle cutoff time (e.g., based on a report that starts and/or ends at the cycle cutoff time) may result in a more precise determination of usage in a given cycle than techniques that do not utilize reports that start and/or end at the cycle cutoff time.

Figure 7:
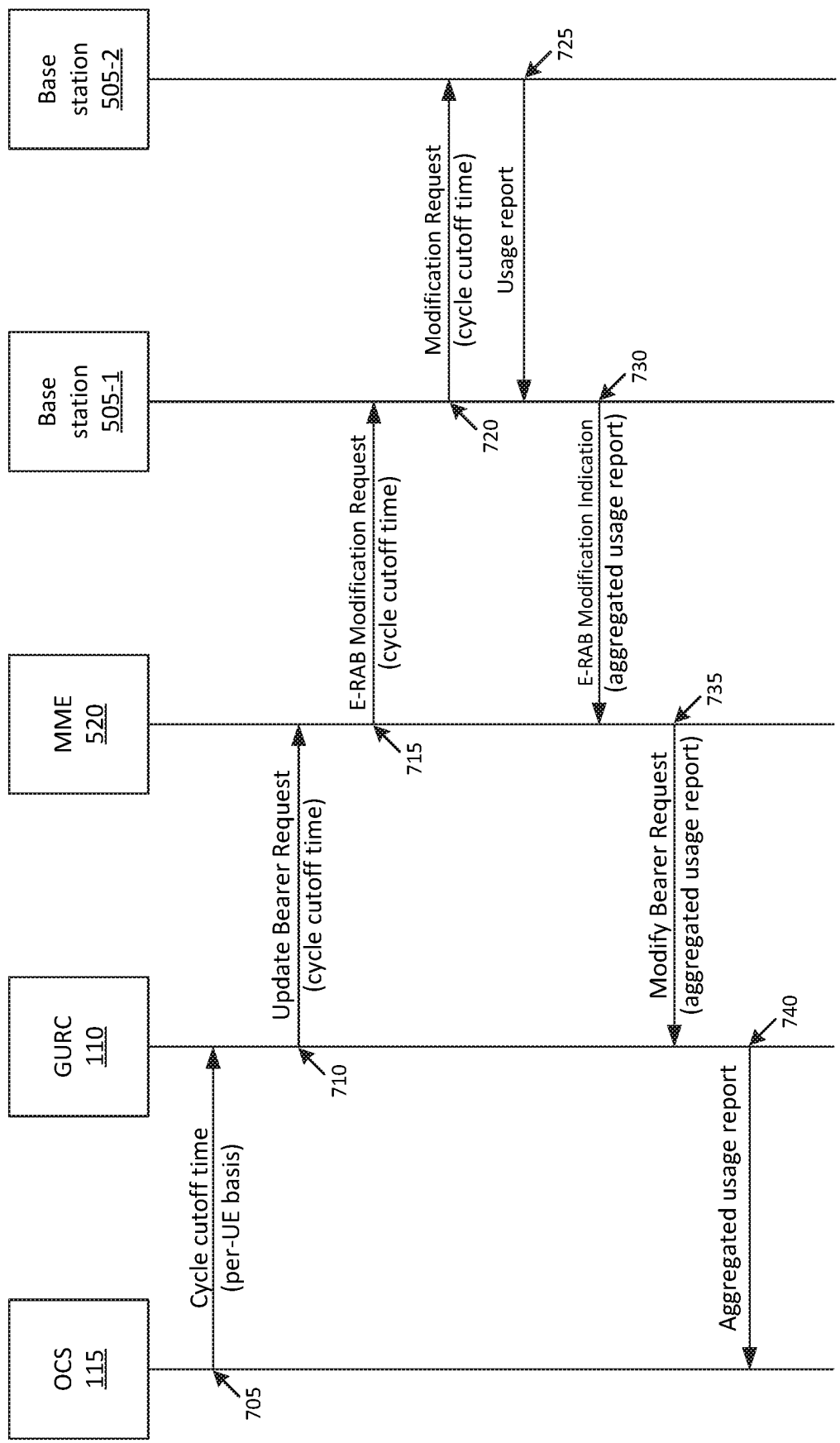
FIG. 7 illustrates an example signal flow for determining usage on multiple RATs for a given UE, in a manner that accounts for dynamically set cycle cutoff times.

FIG. 7 illustrates an example signal flow that may be performed, in some embodiments, to determine per-cycle usage in a granular manner. As shown, for instance, GURC 110 may receive (at 705) an indication of a cycle cutoff time. The cycle cutoff time indication may be provided by, in this example embodiment, OCS 115. In some embodiments, the cycle cutoff time may be provided by one or more other devices and/or systems, and/or may be determined by GURC 110 (e.g., as discussed above). The cycle cutoff time may be sent on a per-UE basis, such that different UEs 105 are associated with different cycle cutoff times. In this manner, multiple different cycle cutoff times, for different UEs 105, may be provided (at 705) and/or determined at the same time, or at substantially the same time (e.g., within the same message or set of messages). The cycle cutoff times may include identifiers of the UEs with which they are respectively associated, such as International Mobile Station Equipment Identity ("IMEI") values, International Mobile Subscriber Identity ("IMSI") values, and/or other suitable identifiers.

GURC 110 may notify (at 710) MME 520 of the cycle cutoff time (e.g., as received at 705) for one or more UEs. For example, GURC 110 may generate one or more "Update Bearer Request" messages (e.g., GTP messages) that each indicate the cycle cutoff time for a given UE 105, and output the one or more messages to MME 520.

Once receiving the message (sent at 710) for a given UE 105, MME 520 may locate UE 105 (e.g., may identify a base station 505 to which UE 105 is connected, and/or a master base station 505 that is communicatively coupled to a secondary base station 505). In this example, MME 520 may locate UE 105 as being connected to base station 505-1 in this example (where base station 505-1 is a master base station 505 communicatively coupled to secondary base station 505-2, with which UE 105 is also connected).

MME 520 may notify (at 715) base station 505-1 of the cycle cutoff time. For instance, MME 520 may send an E-Universal Mobile Telecommunications Service ("UMTS") Terrestrial RAN ("UTRAN") Radio Access Barrier ("E-RAB") Modification Request (e.g., a GTP message) to the identified master base station 505-1. In accordance with some embodiments, the E-RAB Modification Request may identify the particular UE 105 with which the cycle cutoff time is associated, and may also indicate the cycle cutoff time.

Base station 505-1 may identify one or more secondary base stations 505, such as base station 505-2, with which UE 105 is connected. For instance, base station 505-1 may be a master base station in a system that utilizes multiple different RATs, and/or otherwise utilizes a hierarchical organization of base stations 505 (e.g., in which one base station, such as base station 505-1, routes, forwards, or otherwise provides control signaling to other base stations 505). In some embodiments, as discussed above, base station 505-1 may implement one RAT (e.g., base station 505-1 may be or include an eNB that implements a 4G RAT) while base station 505-2 implements a different RAT (e.g., base station 505-2 may be or include a gNB that implements a 5G RAT).

Base station 505-1 may monitor usage, associated with the indicated UE 105, based on the cycle cutoff time. For instance, base station 505-1 may monitor uplink and/or downlink usage (e.g., data sent and/or received by base station 505-1), associated with the indicated UE 105, up until the cycle cutoff time. Base station 505-1 may also monitor uplink and/or downlink usage, associated with the indicate UE 105, after the cycle cutoff time, such that the usage before and after the cycle cutoff time are monitored.

Base station 505-1 may output a Modification Request message to base station 505-2 (e.g., over an X2 interface, and/or some other suitable communication pathway). For instance, in scenarios where 505-2 implements a 5G RAT, base station 505-1 may output a gNB Modification Request message to base station 505-2, indicating the cycle cutoff time and the particular UE 105 with which the cycle cutoff time is associated. The Modification Request may include an information element ("IE") that indicates that the Modification Request includes the cycle cutoff time, and may further include a value that represents the cycle cutoff time (e.g., a numerical offset from a reference time, and/or some other suitable manner of representing the time).

Base station 505-2 may receive the indication of the cycle cutoff time, and may monitor usage, associated with the indicated UE 105, based on the cycle cutoff time. For instance, base station 505-2 may monitor uplink and/or downlink usage, associated with the indicated UE 105, up until the cycle cutoff time. Base station 505-2 may also monitor uplink and/or downlink usage, associated with the indicate UE 105, after the cycle cutoff time, such that the usage before and after the cycle cutoff time are monitored.

After the cycle cutoff time has passed, base station 505-2 may output (at 725) a usage report to base station 505-1 (e.g., over an X2 or other suitable interface). In some embodiments, the usage report may be, or may include, a Secondary RAT Data Volume Report. The usage report may indicate usage, associated with the indicated UE 105, up until the cycle cutoff time. The report may indicate usage between when the last report was sent and/or generated, and the cycle cutoff time. The report may, in some embodiments, indicate the usage between the beginning of the cycle and the cycle cutoff time. In some scenarios, the report may indicate the usage between some time during the cycle (but after the beginning of the cycle) and the cycle cutoff time. In these scenarios, the usage during the cycle may be determined (e.g., by GURC 110 and/or some other device or system) based on multiple usage reports that correspond to the cycle.

Base station 505-1 may generate an aggregated usage report, which may indicate the usage of base station 505-1 and base station 505-2, by UE 105, prior to the cycle cutoff time. Base station 505-1 may provide (at 730) the aggregated usage report to HSS/AAA server 520. In some embodiments, the aggregated usage report may be provided (at 730) as part of an E-RAB Modification Indication (e.g., a GTP message). HSS/AAA server 520 may provide (at 735) the aggregated usage report to GURC 110. In some embodiments, the aggregated usage report may be provided (at 735) as part of a Modify Bearer Request (e.g., a GTP message).

GURC 110 may provide (at 740) the aggregated usage report to OCS 115. In some embodiments, GURC 110, OCS 115, and/or some other device or system, may determine usage on a per-cycle basis, a per-UE basis, and further on a per-base station basis (or a per-RAT basis). As mentioned above, per-cycle usage may encompass multiple usage reports, including the usage report that is based on the cycle cutoff.

Figure 8:
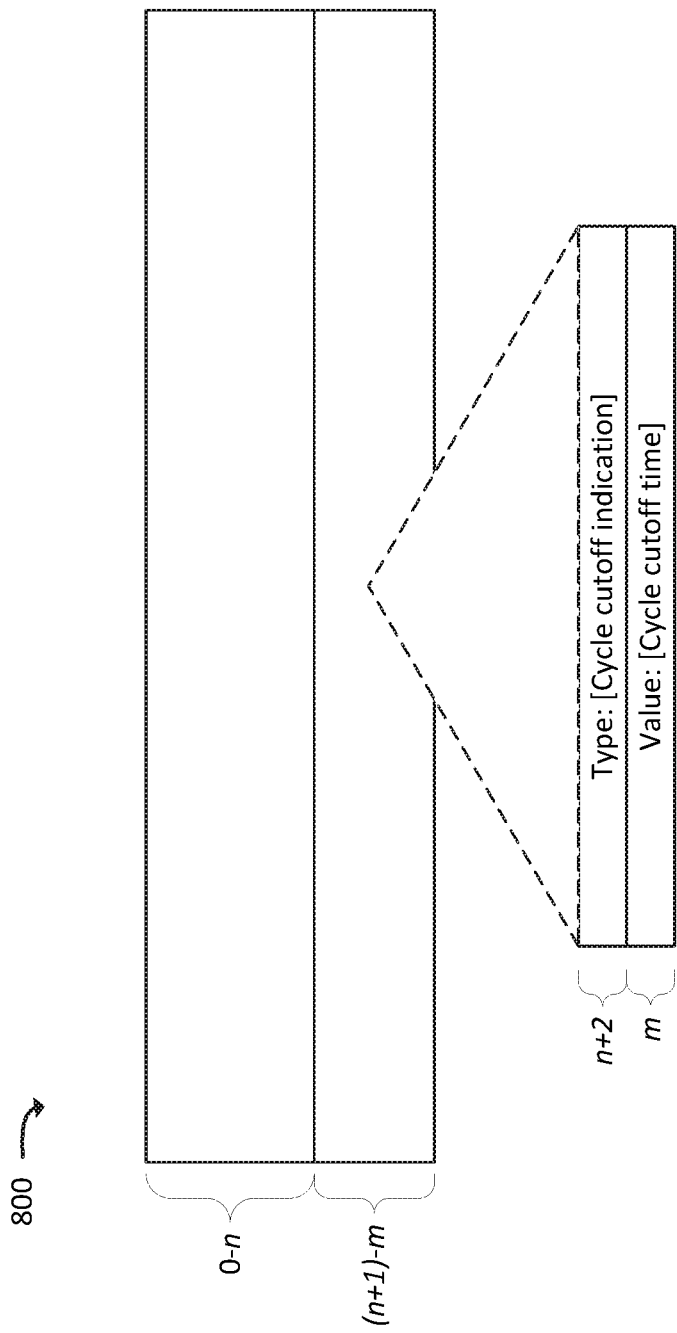
FIG. 8 illustrates an example of a message that may be sent from a Granular Usage Reporting Component ("GURC"), in accordance with some embodiments.

FIG. 8 illustrates an example data structure 800, which may correspond to a GTP message that includes the cycle cutoff time (e.g., an Update Bearer Request or an E-RAB Modify Request), as discussed above (e.g., at signals 710 and/or 715 of FIG. 7). For example, the GTP message may include m sets of data (e.g., m octets). In some embodiments, one portion (e.g., octets 0 through n) of the GTP message may conform to a preset standard, and may include data according to the preset standard. The GTP message may further include another portion (e.g., octets n+1 through m, in this example) that may be used to indicate the cycle cutoff time (e.g., as determined by OCS 115, GURC 110, and/or one or more other devices or systems). The GTP message may include a set of data (e.g., an octet, such as octet n+2, in this example) that includes a value (e.g., a "type" value) that indicates that the GTP message includes a cycle cutoff time. The GTP message may also include a set of data (e.g., an octet, such as octet m, in this example) that indicates the cycle cutoff time. The cycle cutoff time may, in some embodiments, be represented by a numerical offset from a reference time. In some embodiments, the cycle cutoff time may be represented in the GTP message in some other suitable manner.

Figure 9:
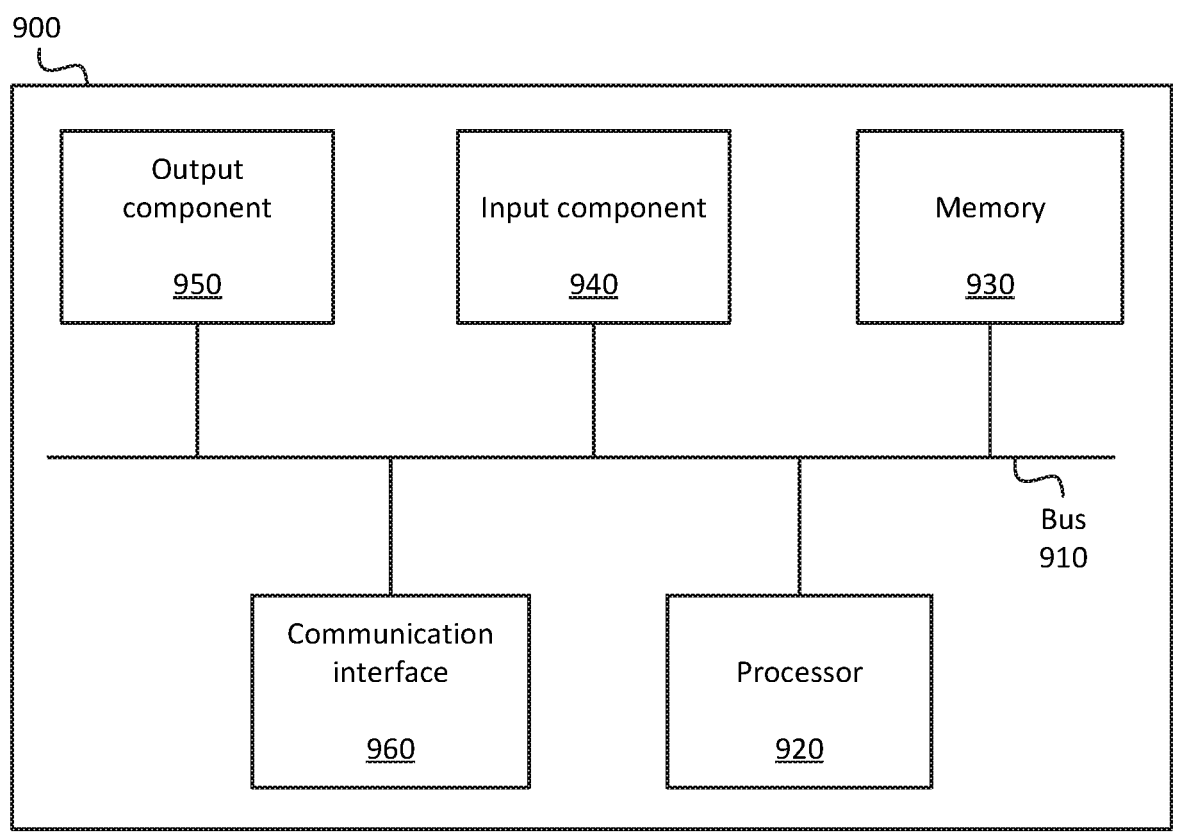
FIG. 9 illustrates example components of one or more devices, according to one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 1A, 1B, 6, and 7, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
identify a first time at which a particular cycle, during which usage of resources of a wireless telecommunications network, by a particular User Equipment ("UE") is tracked, should be terminated,
wherein the UE is connected to at least a first base station of the wireless telecommunications network and a second base station of the wireless telecommunications network,
wherein the first and second base stations are configured to report usage, by the particular UE, on a periodic basis, wherein a particular time period ends at a second time that is later than the first time, and wherein the first time falls within the particular time period;
notify, prior to the first and second times, the first base station of the identified first time;
receive, from the first base station, information indicating:
a first amount of usage by the particular UE via the first base station between a beginning of the particular time period and the identified first time, and
a second amount of usage by the particular UE via the second base station between the beginning of the particular time period and the identified first time;
determine a first amount of usage via the first base station, by the particular UE during the particular cycle, based on the received information; and
determine a second amount of usage via the second base station, by the particular UE during the particular cycle, based on the received information.

2. The device of claim 1, wherein the first base station implements a first radio access technology ("RAT"), and wherein the second base station implements a second RAT that is different from the first RAT.

3. The device of claim 1, wherein the first base station is a master base station and the second base station is a secondary base station.

4. The device of claim 1, wherein executing the processor-executable instructions, to notify the first base station, further includes:
outputting a message, including an indication of the identified first time, to a Mobility and Management Entity ("MME") of the wireless telecommunications network.

5. The device of claim 4, wherein the message is a first message, wherein the MME identifies that the UE is connected to the first base station, and wherein the MME further outputs a second message to the first base station, the second message indicating the identified first time.

6. The device of claim 5, wherein the first base station outputs a third message to the second base station, the third message indicating the identified first time.

7. The device of claim 4, wherein the message includes a General Packet Radio Service ("GPRS") Tunneling Protocol ("GTP") message.

8. A non-transitory computer-readable medium, storing a set of processor-executable instructions, which, when executed by one or more processors, cause the one or more processors to:
identify a first time at which a particular cycle, during which usage of resources of a wireless telecommunications network, by a particular User Equipment ("UE") is tracked, should be terminated,
wherein the UE is connected to at least a first base station of the wireless telecommunications network and a second base station of the wireless telecommunications network,
wherein the first and second base stations are configured to report usage, by the particular UE, on a periodic basis, wherein a particular time period ends at a second time that is later than the first time, and wherein the first time falls within the particular time period;
notify, prior to the first and second times, the first base station of the identified first time;
receive, from the first base station, information indicating:
a first amount of usage by the particular UE via the first base station between a beginning of the particular time period and the identified first time, and
a second amount of usage by the particular UE via the second base station between the beginning of the particular time period and the identified first time;
determine a first amount of usage via the first base station, by the particular UE during the particular cycle, based on the received information; and
determine a second amount of usage via the second base station, by the particular UE during the particular cycle, based on the received information.

9. The non-transitory computer-readable medium of claim 8, wherein the first base station implements a first radio access technology ("RAT"), and wherein the second base station implements a second RAT that is different from the first RAT.

10. The non-transitory computer-readable medium of claim 8, wherein the first base station is a master base station and the second base station is a secondary base station.

11. The non-transitory computer-readable medium of claim 8, wherein the processor-executable instructions, to notify the first base station, further include processor-executable instructions to:
output a message, including an indication of the identified first time, to a Mobility and Management Entity ("MME") of the wireless telecommunications network.

12. The non-transitory computer-readable medium of claim 11, wherein the message is a first message, wherein the MME identifies that the UE is connected to the first base station, and wherein the MME further outputs a second message to the first base station, the second message indicating the identified first time.

13. The non-transitory computer-readable medium of claim 12, wherein the first base station outputs a third message to the second base station, the third message indicating the identified first time.

14. The non-transitory computer-readable medium of claim 11, wherein the message includes a General Packet Radio Service ("GPRS") Tunneling Protocol ("GTP") message.

15. A method, comprising:
identifying a first time at which a particular cycle, during which usage of resources of a wireless telecommunications network, by a particular User Equipment ("UE") is tracked, should be terminated,
wherein the UE is connected to at least a first base station of the wireless telecommunications network and a second base station of the wireless telecommunications network,
wherein the first and second base stations are configured to report usage, by the particular UE, on a periodic basis, wherein a particular time period ends at a second time that is later than the first time, and wherein the first time falls within the particular time period;
notifying, prior to the first and second times, the first base station of the identified first time;
receiving, from the first base station, information indicating:
a first amount of usage by the particular UE via the first base station between a beginning of the particular time period and the identified first time, and
a second amount of usage by the particular UE via the second base station between the beginning of the particular time period and the identified first time;
determining a first amount of usage via the first base station, by the particular UE during the particular cycle, based on the received information; and
determining a second amount of usage via the second base station, by the particular UE during the particular cycle, based on the received information.

16. The method of claim 15, wherein the first base station implements a first radio access technology ("RAT"), and wherein the second base station implements a second RAT that is different from the first RAT.

17. The method of claim 15, wherein the first base station is a master base station and the second base station is a secondary base station.

18. The method of claim 15, wherein notifying the first base station further includes:
outputting a message, including an indication of the identified first time, to a Mobility and Management Entity ("MME") of the wireless telecommunications network.

19. The method of claim 18, wherein the message is a first message, wherein the MME identifies that the UE is connected to the first base station, and wherein the MME further outputs a second message to the first base station, the second message indicating the identified first time.

20. The method of claim 19, wherein the first base station outputs a third message to the second base station, the third message indicating the identified first time.

* * * * *